United States Patent [19]

Disbrow

[11] 4,411,386
[45] Oct. 25, 1983

[54] APPARATUS FOR CONTROLLING SPRAY PATTERN

[76] Inventor: Lynnford E. Disbrow, 1400 W. Bruneau, Kennewick, Wash. 99336

[21] Appl. No.: 334,556

[22] Filed: Dec. 28, 1981

[51] Int. Cl.³ ............................................. B05B 3/00
[52] U.S. Cl. ............................. 239/177 R; 239/710; 239/DIG. 1
[58] Field of Search ............... 239/177, 710, DIG. 1

[56] References Cited

U.S. PATENT DOCUMENTS

| | | | |
|---|---|---|---|
| 2,529,491 | 11/1950 | Gadzuk | 137/78.5 |
| 2,721,101 | 10/1955 | Richard | 137/78.3 |
| 2,878,098 | 3/1959 | Treloar et al. | 137/78.5 |
| 2,988,287 | 6/1961 | Sherman | 239/177 |
| 3,099,393 | 7/1963 | Lent | 239/265 |
| 3,117,586 | 1/1964 | Cleaver | 137/78.5 |
| 3,361,356 | 1/1968 | Johnson | 137/78.2 |
| 3,667,673 | 6/1972 | Knudsen | 239/256 |
| 3,782,637 | 1/1974 | Crumpacker | 239/232 |
| 4,033,508 | 7/1977 | Jacobi et al. | 239/177 |
| 4,072,269 | 2/1978 | Berg | 239/1 |
| 4,128,205 | 12/1978 | Coash | 239/177 |
| 4,249,698 | 2/1981 | Smith et al. | 239/1 |

FOREIGN PATENT DOCUMENTS 127123  4/1959  U.S.S.R. ............... 239/DIG. 1

*Primary Examiner*—John J. Love
*Assistant Examiner*—Jon M. Rastello
*Attorney, Agent, or Firm*—Wells, St. John & Roberts

[57] ABSTRACT

In a center pivot irrigation system, an apparatus for controlling the spray pattern delivered by an end gun having at least one adjustable stop by varying end gun travel along an end gun delivery path. A sensing means detects changes in wind condition and produces a signal corresponding thereto. The signal thus produced operates an end gun controlling means which is adapted to adjust the end gun stop and vary the path of end gun travel. By this means, end gun spray pattern is maintained as a function of current wind condition.

13 Claims, 7 Drawing Figures

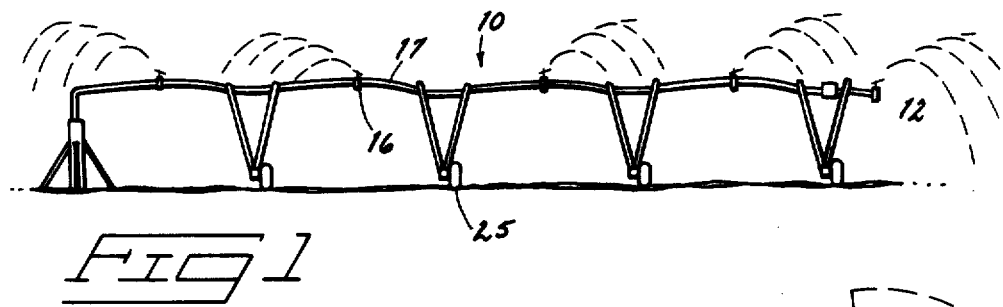
FIG 1
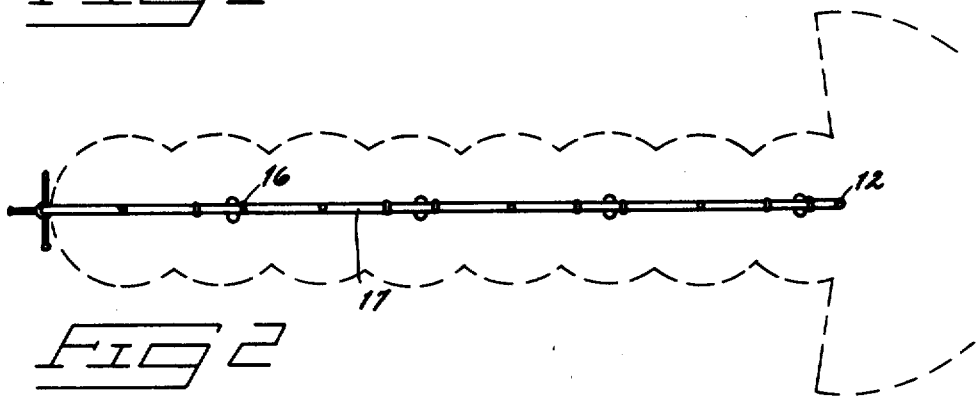
FIG 2
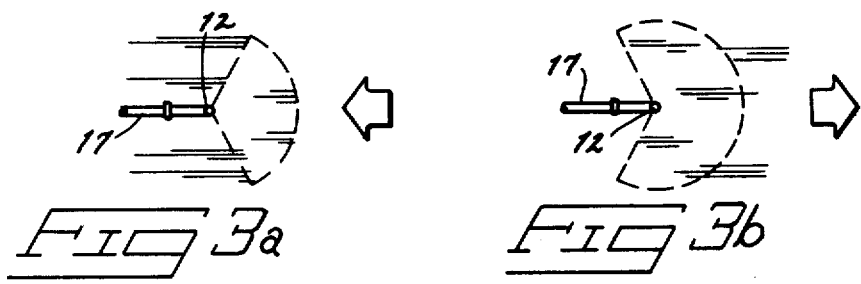
FIG 3a   FIG 3b
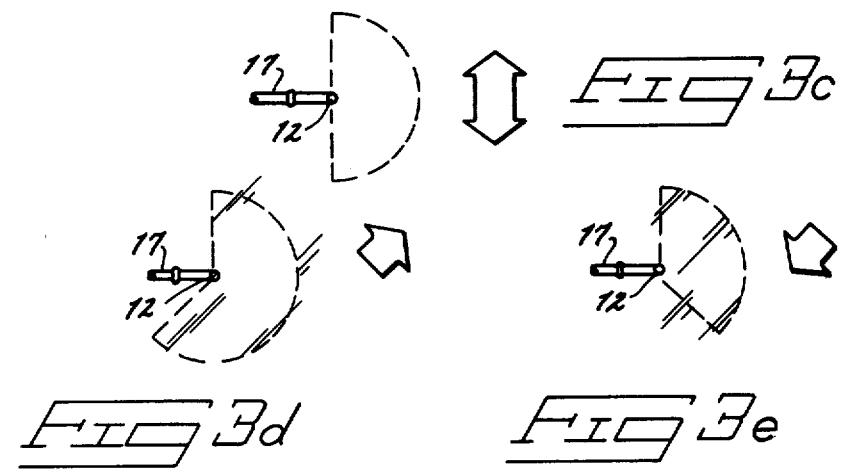
FIG 3c
FIG 3d   FIG 3e

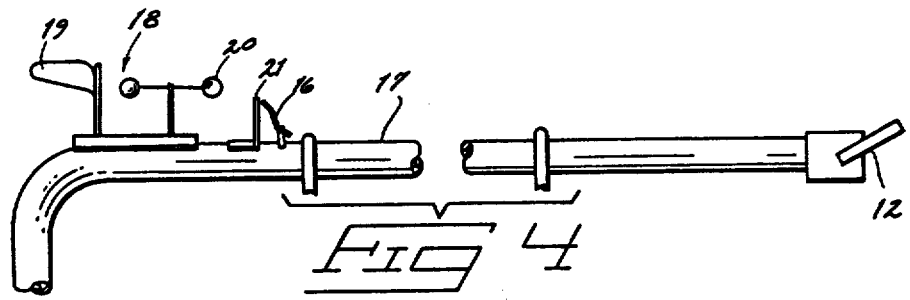
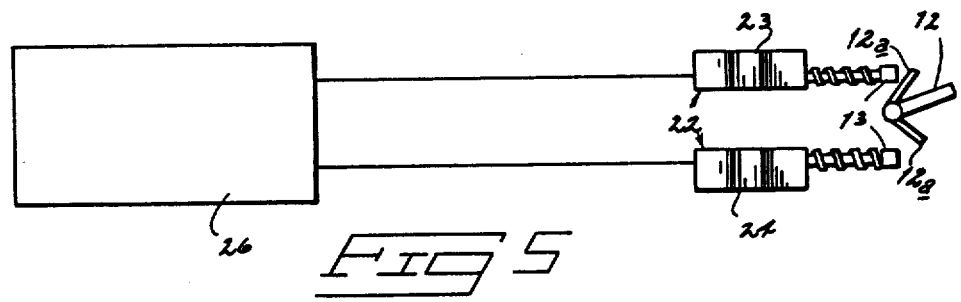
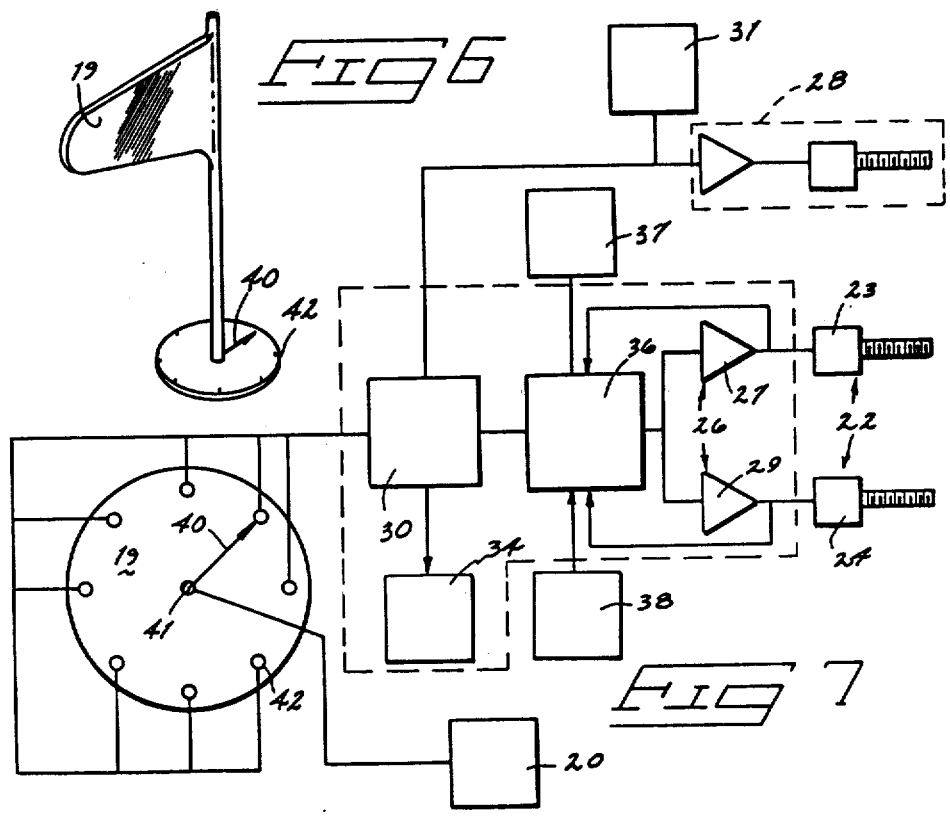

APPARATUS FOR CONTROLLING SPRAY PATTERN

TECHNICAL FIELD

My invention relates to center pivot irrigation systems.

BACKGROUND OF THE INVENTION

Center pivot irrigation systems are used extensively in agriculture. The center pivot irrigation system consists of a series of sprinklers on a movable pipeline. At one end of the pipeline is an end gun sprinkler. Its purpose is to extend the range of operation of the sprinkler system beyond the length of the pipeline.

The end gun normally applies three to twenty times as much water as the other sprinklers that are arranged along the elongated sprinkler pipeline. The end gun sprinkles at a different angle than the other sprinklers. The end gun sprinkler mechanism is similar to an impulse lawn sprinkler, only on a larger scale.

The end gun includes an overcenter device that hits a stop at one end of an end gun path of travel to reverse end gun travel direction. After travelling the path, the overcenter device hits a stop at the other end of a desired arc or end gun path of travel where the end gun is reset to travel in the reverse direction. The end gun is moved across its path of travel by the force of a water stream directed against an impulse weight and vane on the gun.

A center pivot irrigation system cannot operate without water; once the system is pressurized it cannot be stopped until the water pressure is removed. Adjustment of the center pivot irrigation system end gun is critical for correct crop watering, and yet it is difficult to perform end gun adjustment correctly.

To adjust the end gun, one has to shut the system down, travel to the end gun, put up a ladder (which may be fifteen feet in the air; and where the ground is normally wet and soft), and try to adjust the end gun stops. Such a procedure is both time consuming and subject to repetitive trial and error adjustment until a correct setting is obtained.

After an initial adjustment is made, the pivot irrigation system is turned back on and the adjustment must be checked for accuracy. This process is repeated over and over again until the end gun spray pattern is correct. Much time and effort is wasted on this procedure. Consequently, end gun adjustment is not performed as often or as accurately as it should be.

In addition to the difficulty of initially adjusting the end gun in a center pivot sprinkler system, there is the problem of wind effect on end gun sprinkler spray pattern. When the system sprinkler is operating during windy conditions, there is an area of over watering on the upwind side of the end gun; there is an area of under watering on the downwind side of the gun. The difficulty of adjusting the end gun when conditions are ideal (no wind) makes it wholly impractical to try to compensate for wind effect on end gun spray patterns.

Uneven crop watering due to wind effect on the end gun spray patterns is a waste. It is a waste of energy to pump the water, it is a waste of the water, and it is a waste of time. Farming is a business activity that produces a narrow margin of profit. Any inefficiency in farm operation that reduces that narrow profit can mean the difference between a profit or a loss on a year's crops. Inefficient watering—in addition to raising the cost of producing a crop—decreases the yield per acre in a given crop. Lower yields mean lower returns and losses or reduced profits.

Various crude solutions to the problem of end gun adjustment have been suggested. Examples of such proposed solutions are the Coash U.S. Pat. No. 4,128,205 issued Dec. 5, 1978 and the Sherman U.S. Pat. No. 2,988,287 issued June 13, 1961. These prior attempts to solve the end gun adjustment and wind effect problems have relied on mechanical control of end gun spray intensity and inclusion of auxiliary nozzles. Although the problems inherent in center pivot sprinkler irrigation systems have been recognized and attempts have been made to solve the problems, there has as yet been no satisfactory solution to the problem of end gun adjustment and wind compensation.

BRIEF DESCRIPTION OF DRAWINGS

A preferred embodiment of my invention is illustrated in the accompanying drawings, in which:

FIG. 1 is a side view of a pivot irrigation system;

FIG. 2 is a plan view;

FIGS. 3*a* through 3*e* are schematic representations of wind effect on end gun spray pattern;

FIG. 4 is a side view;

FIG. 5 is a top view;

FIG. 6 is a schematic of the wind sensor; and

FIG. 7 is a schematic of the controls.

DETAILED DESCRIPTION OF A PREFERRED EMBODIMENT

My invention is an apparatus for controlling the spray pattern of an end gun in a pivot irrigation system. By controlling end gun spray pattern relative to wind conditions, watering efficiency is increased, resulting in improved crop yields.

Center pivot irrigation systems are in common use in agriculture. A typical center pivot irrigation system 10 (FIG. 1) includes an elongated pipeline or tube 17 upon which are mounted a series of sprinkler guns 16. The tube 17 is supported by a series of wheels 15 spaced along the tube. One end of the tube provides a pivot point about which the irrigation system pivots by rolling upon the wheels 15. The other end of the tube 17 includes a reciprocating end gun 12 to extend the spray pattern beyond the length of the tube. The force of water pumped through the tube to the sprinklers 16 and the end gun 12 causes the end gun to reciprocate along a path of travel. Water force also operates the other sprinklers to spread water over a desired pattern.

A preferred form of end gun 12 includes a reciprocating means (not shown) for reciprocatingly swinging end gun 12 back and forth through its arc or path of travel. A common type of reciprocating means employs a pivotally mounted impulse weight and vane unit (not shown). The vane oscillates into and out of the stream of water issuing from the end gun 12. The extent to which the impulse weight and vane unit is allowed to oscillate governs the direction of the turning force applied by the oscillating impulse weight. A reversing mechanism 12*a* is also included and usually has two positions, one where it engages the impulse weight and the other where it does not. These two positions of the reversing mechanism 12*a* correspond to swinging the end gun one direction or the opposite direction. The reversing mechanism can advantageously be an overcenter type link which is biased so that it tends to stay in either of the two positions.

End gun 12 reverses its direction of swing when the gun swings into a position causing attached over-center reversing mechanism 12a to hit either of stops 13. When the over-center reversing mechanism 12a moves sufficiently far to trip into the other position then the impulse weight and vane unit is either released or engaged. This change causes the dynamics of the oscillating impulse weight and vane unit to produce a torque which is in the opposite direction. End gun 12 then changes the direction of swing. Such reciprocating sprinkler heads or end guns as just described are widely used in the field of irrigation and are well-known to one of ordinary skill in the art. Alternative end guns can also be used having different means of reciprocating and different reversing mechanisms. The only limitation being that the end gun 12 be controllable in the direction of its swing by contacting the adjustable positions of stops 13.

My invention is adapted to be installed upon such a pivot irrigation system and includes a sensing means 18 that consists of a wind direction sensor 19 and a wind velocity sensor 20. The sensing means 18 is operably connected to an amplifier 26. The amplifier, in turn, is operably connected to an end gun controlling means, such as servo 22. The servo includes a first end gun travel limit drive 23 and a second end gun travel limit drive 24. Shield 21 provides a calm spot for the sensing means 18 in the midst of all the water being sprayed by the sprinkler guns 16.

In operation, wind is sensed by the wind sensing means 18. Wind direction is indicated by wind direction sensor 19 (FIG. 6) that includes a wind responsive vane connected to a shaft. The base of the shaft is connected to a center conductor 41 and a wiper arm 40 that is pivotable about a series of outside contacts 42 in response to wind direction changes. In this way, the wind direction sensor 19 generates a control signal indicating wind direction.

Wind velocity is indicated by wind velocity sensor 20. In this embodiment of my invention, the wind velocity sensor is a cup anemometer connected by a shaft to a generator. Variations in wind velocity change the voltage produced by the generator. The generator is connected to the center contact of the wind direction sensor 19 and changes in wind direction direct the voltage generated by the wind velocity sensor 20 to the various outside contacts on the wind direction sensor 19.

The signal developed by the wind sensing means 18 is routed to an amplifier 26 which consists of a left amplifying section 27 and a right amplifying section 29. When either amplifier section (27 or 29) receives a drive signal from the wind sensing means 18, that signal is amplified. The amplified signal is of a sufficient level to operate the end gun controlling servo 22.

The servo 22 consists of a first end gun travel limit drive 23 responsive to the left amplifier drive signal and a second end gun travel limit drive 24 responsive to the right amplifier drive signal.

The end gun 12 moves back and forth across an end gun delivery path. The length of the path in either direction is determined by adjustable stops 13. By adjusting one stop or the other, or by adjusting the stops in combination, the end gun delivery pattern amy be varied to compensate for wind direction and velocity as indicated by arrows in FIGS. 3a through 3e.

As the wind direction changes, the vane on the wind direction sensor 19 is turned to connect the center contact 41, via the wiper 40 to a corresponding outside contact 42. Voltage generated by the wind velocity sensor 20 in response to wind conditions is routed through the center contact 41 of the wind direction sensor 19. Wind direction, as sensed by the wind direction sensor 19 is translated to a drive signal as shown in FIG. 7. Depending on wind direction, a signal may be routed to the left amplifier 27, the right amplifier 29, both amplifiers, or neither amplifier. The signal may result in a positive drive, negative drive, or no drive condition being applied to the servo 22. Intensity of the drive signal is a function of wind velocity as determined by the voltage generated by the wind velocity sensor 20.

In response to the drive signal from the wind sensing means 18, the amplifiers drive the servo 22 to move the end gun travel limit drives 23 and 24 in and out. The end gun travel unit drives are operated independently of each other. Movement of the end gun travel limit drives 23 and 24 determines the length of the end gun delivery path in either direction. Thus, the end gun 12 may deliver a broad spray path (FIG. 3b), a narrow spray path (FIG. 3a), or a skewed spray path (broad during one part of path travel and narrow during another part of path travel, as shown in FIGS. 3d and 3e).

Wind direction and velocity may be indicated by other means in different embodiments of my invention and my invention includes other features, such as those discussed in the following paragraphs.

My invention may be powered by a portable battery power source (not shown) as it requires very little current for operation. The pivot irrigation system is in the field all day and constantly exposed to sun (depending on weather conditions). Including a solar cell to charge the battery power source reduces operating cost and frequency of maintenance and improves the reliability of the system.

A shield 21 added to the pivot irrigation system center tube 17 about the wind sensing means 18 reduces interference with wind velocity and direction values obtained, said interference being due to the action of water upon the sensor.

The wind sensing means 18 may also be connected to a gun elevation varying means 28. Not only is end gun delivery path viewed, but end gun elevation can be varied as well. The elevation varying means aims the gun at an ideal elevation in response to wind velocity. Such compensation in gun elevation prevents the water from being carried too far when the wind is blowing in the same direction as the spray and prevents blowback of the water when the wind is blowing against the spray. Elevation control is effected by inclusion of an additional servo drive motor at the end gun 12.

My invention also includes a threshold responsive means 30 that may be set to activate at a predetermined wind velocity. The threshold responsive means 30 is connected to a rate of flow controlling means 31. When a preset velocity is obtained, the rate of flow of fluid to the center pivot irrigation system 10 may be reduced or increased as desired.

In a windy situation, it is desirable to increase pressure of water delivered to the irrigation system and the threshold responsive means 30 could be set to trigger the rate of flow means at a certain wind velocity to increase water pressure. The threshold responsive means 30 could also be connected to the servo amplifier 26. The servo 22 would not be operated until a predetermined wind level was obtained. Thus, ambient wind conditions not considered significant would not trigger the servo system.

A further application of the threshold responsive means 30 would be where liquid fertilizer, pesticide, or other chemicals are being applied though the center pivot irrigation system. A high wind velocity would provide an uneven distribution of the fertilizer or pesticide. When a wind threshold level was obtained, the threshold responsive means 30 would actuate the rate of flow controlling means 31 and cut the flow of fertilizer or pesticide to the center pivot irrigation system until wind conditions were more favorable.

An information storing means 34 is included and may consist of a chart or electromagnetic tape recorder for providing a record of wind velocity and direction as indicated by the sensors 19 and 20. The recorder may also be connected to the threshold responsive means 30 on a time chart to indicate the times at which fertilizer or pesticide was applied and the duration of application.

I have included a manual control means 38 to operate the first and second end gun travel limit drives 23 and 24 for initial alignment of end gun spray pattern. Using this control means, consisting of a series of pushbuttons (not shown) adjustment of end gun no longer requires the use of ladders and no longer results in the farmer getting soaked during the end gun process. Rather, the pushbuttons that operate the manual control 38 may be located on an extension cable (not shown) a distance from the pivot irrigation system end gun 12. Adjustment of the end gun may be made while the system is in operation and when satisfactory adjustment is achieved, the wind control system may then be activated.

Also included in my invention is a servo feedback circuit 36 for monitoring the position of the end gun stops 13 by tracking the position of end gun travel limit drives 23 and 24. The monitored position of the end gun travel limit drives is compared with the current wind velocity and direction information at the amplifier 26 as received from the wind sensors 19 and 20. The feedback signal developed maintains synchronization between current wind conditions as indicated by the wind sensors 19 and 20 and current end gun delivery path as maintained by the end gun travel limit drives 23 and 24. If a loss of synchronization between the end gun travel limit drives and the wind sensing means occurs, a signal is generated by the out-of-sync alarm circuit 37. The signal may be used to operate a flashing light, siren, or other attention getting means. The person operating the sprinkler system can be apprised of the loss of synchronization. The manual control 38 could then be used to restore synchronization between the wind sensing means and the end gun travel limit drives.

My invention is a significant improvement in efficiency of sprinkling systems. Various manufacturers produce a similar type of center pivot irrigation system and my invention is adapted to fit any such system. My invention is subject to various embodiments and modifications and it is intended that it should be limited only by the scope of the claims that follow.

I claim:

1. In a pivot irrigation system having a reciprocating end gun with a reversing mechanism for changing the direction the end gun swings, an apparatus for controlling the spray pattern being delivered by the end gun in response to wind conditions, comprising:

sensing means for detecting wind conditions;

end gun controlling means operably connected to said sensing means and having at least one adjustable stop adjacent to the end gun for engaging the reversing mechanism to change the direction the end gun swings and thereby control the spray pattern of the end gun in response to wind conditions.

2. An apparatus as claimed in claim 1, further comprising:

means operably connected between the sensing means and the end gun controlling means for amplifying signals generated by the sensing means to drive the end gun controlling means.

3. An apparatus as claimed in claim 1, further comprising:

means responsive to a threshold wind velocity for controlling rate of flow from the end gun.

4. An apparatus as claimed in claim 3, further comprising:

means for storing wind condition and rate of flow values.

5. An apparatus for controlling the spray pattern delivered by a reciprocating end gun of a center pivot irrigation system in response to wind conditions, the end gun having an overcenter reversing mechanism for reversing the direction in which the end gun swings, comprising:

a wind sensing means; and at least one adjustable servo operably connected to the wind sensing means for adjustment thereby the servo having at least one stop attached thereto for adjustably engaging the overcenter reversing mechanism to vary the end gun travel along the overcenter reversing mechanism to vary the end gun travel along the delivery path in response to wind conditions.

6. An apparatus as claimed in claim 5, further comprising:

an amplifier operably connected between the wind sensing means and the servo for increasing the amplitude of signals generated by the wind sensing means to drive the servo.

7. An apparatus as claimed in claim 5, wherein the wind sensing means comprises:

a wind direction sensor; and a wind velocity sensor.

8. An apparatus as claimed in claim 5, wherein the servo further comprises:

a first end gun travel limit drvie for controlling the position of an adjustable stop attached thereto, and a second end gun travel limit drive for controlling the position of an adjustable stop attached thereto;

the end gun travel limit drives being adapted to adjust the end gun stops in response to signals generated by the wind sensing means.

9. An apparatus as claimed in claim 5, further comprising:

means responsive to a threshold wind velocity for controlling liquid rate of flow from the end gun.

10. An apparatus as claimed in claim 9, further comprising:

means for storing wind condition and rate of flow values.

11. An apparatus as claimed in claim 5, further comprising:

an end gun elevation varying means responsive to signals generated by the wind sensing means and adapted to vary end gun elevation angle.

12. An apparatus as claimed in claim 5, further comprising:
  means in the form of a feedback circuit responsive to servo position and current wind condition as indicated by the wind sensing means for synchronizing servo operation with current wind condition.

13. An apparatus as claimed in claim 12, further comprising:
  an out-of-synchronization alarm for indicating loss of synchronization between servo positioning and current wind condition.

* * * * *